Sept. 15, 1925.  A. E. COURTOT  1,553,893
PISTON RING
Filed June 20, 1925
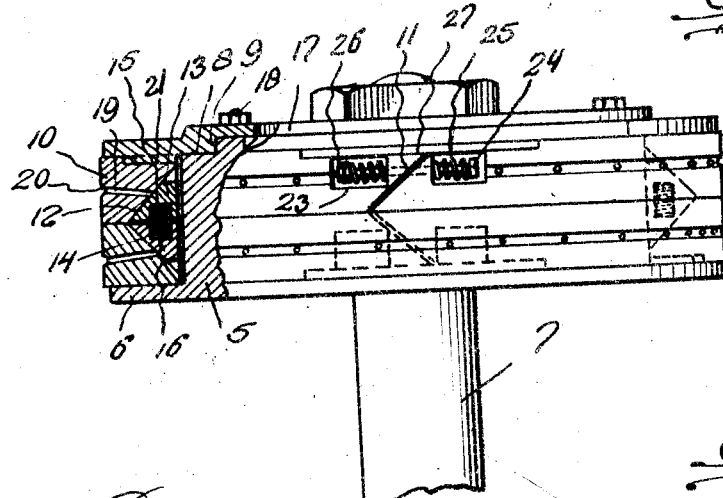
Fig. 1
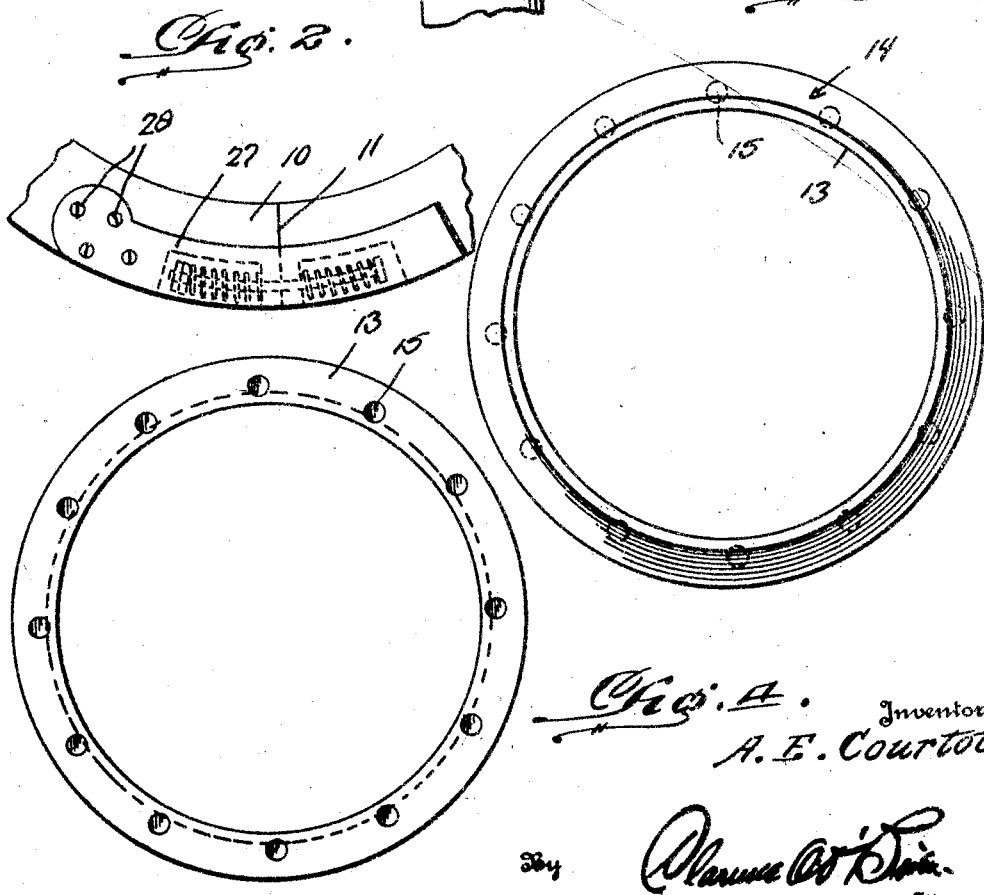
Fig. 2.
Fig. 3
Fig. 4.
Inventor
A. E. Courtot,
By
Attorney Patented Sept. 15, 1925.

1,553,893

UNITED STATES PATENT OFFICE.

ALPHONSE E. COURTOT, OF WOODHAVEN, NEW YORK.

PISTON RING.

Application filed June 20, 1925. Serial No. 38,460.

*To all whom it may concern:*

Be it known that I, ALPHONSE E. COURTOT, a citizen of the United States, residing at Woodhaven, L. I., in the county of Queens and State of New York, have invented certain new and useful Improvements in a Piston Ring, of which the following is a specification.

The present invention relates generally to pistons and more particularly to improvements in the rings that are used as packing on pistons.

The principal object of the invention is to provide a leak-proof ring which has incorporated therewith means for expanding it outwardly of the piston against the inner wall of the cylinder so as to prevent the leakage of gas, liquid, or the like between the pistons and the inner cylinder wall.

Another object of the invention is to provide a ring of this nature having the expansible means associated therewith wherein the feature of expansibility may be adjustably controlled.

A still further object of the invention is to provide a piston and ring of this nature which are simple in construction, strong, durable, comparatively inexpensive to manufacture, efficient and reliable in use, not likely to easily become out of order, and otherwise well adapted to the purpose for which they are designed.

With the above and numerous other objects in view as will appear as the description proceeds, the invention resides in certain novel features of construction and in the combination and arrangement of parts as will be hereinafter more fully described and claimed.

In the drawing—

Figure 1 is a sectional elevation of a piston and ring structure embodying the features of my invention, Fig. 2 is a fragmentary plan view of one of the outer rings, Fig. 3 is a plan view of one of the inner rings, and Fig. 4 is another plan view thereof taken from the other side.

Referring to the drawing in detail, it will be seen that 5 designates a piston having an outwardly disposed annular flange 6 extending from one end thereof. Any suitable rod 7 is associated with the piston. On the opposite end of the body 5 there is provided an annular recess 8 so as to form an annular shoulder 9. A pair of outer rings 10 of the split type as is indicated at 11 are disposed about the cylindrical surface of the body in superimposed relation to each other, one of said rings resting on the flange 6. The inner surfaces of these outer split rings 10 are beveled as is indicated at 12, one inner surface being beveled in an opposite direction to the other as is indicated to advantage in the sectional portion of Fig. 1. Inner rings 13 are disposed about the cylindrical surface of the pistons 5 and are provided with outer beveled surfaces 14 disposed at similar angles as are the surfaces 12.

These rings 13 are provided with pockets 15 extending inwardly from their abutting ends and springs 16 are disposed in said pockets being tensioned to normally separate the rings 13 from each other, and because of the beveled surfaces 12 and 14 function as a wedge on the principle of the inclined plane so as to expand the outer rings 10. The functioning of these rings 10 and 13 and the spring 16 seems to be obvious.

A plate 17 is detachably fixed as at 18 to the end of the piston 5 opposite to that provided with the flange 6 and holds the rings 10 and 13 assembled on the piston. Said plate has its outer portion offset in relation to its inner portion so as to fit in the recess 8 and abut the shoulder 9, thus tending to prevent any undesirable play between the plate and the piston.

If desired, the outer rings 10 may be constructed with a plurality of radially disposed orifices 19 extending inwardly from annular grooves 20 so that oil may pass from the grooves through the orifices and lubricate the surfaces 12 and 14. If desired, a key 21 may be provided on the plate 17 for engaging in a way provided on the adjacent ring 10 and a similar key may be provided on the flange 6 for engagement in a way provided on the adjacent ring 10 so as to prevent rotary movement of the rings in relation to the piston and also to hold the split ends 11 of one ring diametrically opposite to the similar ends of the other rings as is indicated in full and dotted lines in Fig. 1.

In order to control adjustably the expansion of the rings 10 caused by the rings 13 and springs 16, I have constructed the rings 10 adjacent their ends 11 with pockets 23 so that an arcuate bolt 24 curved concentrically with the general curvature of the ring may be passed through the ends of the ring to extend circumferentially thereof and so that springs 25 may be disposed thereabout between the head of the bolt and the adjustment nuts 26 thereon and the ends of the recesses 23. By adjusting the nuts 26 it will be seen that the springs 25 may be tensioned so as to adjustably control the expansibility of the rings 10. Cover plates 27 are provided on the edges of the rings 10 to extend over the recesses 23. These plates 27 are removable, being detachably held in place by screws 28 or other suitable securing elements.

It is thought that the construction, operation, utility, and advantages of my invention will now be clearly understood without a more detailed description thereof. The present embodiment of the invention has been disclosed merely by way of example and in actual practice has proven capable of attaining the various features of advantage enumerated in the statement of the invention and the above description. However, it is apparent that numerous changes in the details of construction, and in the combination and arrangement of parts may be resorted to without departing from the spirit or scope of the invention as hereinafter claimed or sacrificing any of its advantages.

Having thus described my invention, what I claim as new is:—

1. As a new article of manufacture, a piston ring of the split type having its ends normally disposed in close proximity to each other and provided with recesses, an arcuate bolt extending through the ends of the ring terminating within the recesses, a head on one end of the bolt, springs on the bolt and a nut on the bolt for tensioning said spring to urge the ends of the ring toward each other.

2. In a piston structure, a piston, a pair of continuous rings disposed about the piston and having oppositely inclined outer surfaces, resilient means tending to separate the inner rings from each other, a pair of expansible split rings disposed about the first rings and about the piston, and resilient means associated with the ends of the split rings to urge them toward each other.

3. In a piston structure, a piston, a pair of continuous rings disposed about the piston and having oppositely inclined outer surfaces, resilient means tending to separate the inner rings from each other, a pair of expansible split rings disposed about the first rings and about the piston, resilient means associated with the ends of the split rings to urge them toward each other, said means being adjustable.

4. As a new article of manufacture, a piston ring of the split type having its ends normally disposed in close proximity to each other and provided with recesses, an arcuate bolt extending through the ends of the ring terminating within the recesses, a head on one end of the bolt, springs on the bolt one in each recess, a nut on the bolt for tensioning said springs to urge the ends of the springs toward each other, and a cover plate fixed to one end of the ring so as to be disposed over both recesses.

5. In a piston structure, a piston, a pair of continuous rings disposed about the piston and having oppositely inclined outer surfaces, resilient means tending to separate the inner rings from each other, a pair of expansible split rings disposed about the first rings and about the piston, the ends of said split rings being provided with recesses, arcuate bolts extending through the ends of the split rings and terminating in the recesses, a head on one end of each bolt, springs on the bolts, one in each recess, and nuts on the bolts for tensioning said springs for urging the ends of the split rings toward each other.

In testimony whereof I affix my signature.

ALPHONSE E. COURTOT.